United States Patent
Johnson et al.

(10) Patent No.: US 12,123,352 B2
(45) Date of Patent: Oct. 22, 2024

(54) VIBRATION DAMPER FOR FLUID CONDUIT OF GAS TURBINE COMBUSTOR

(71) Applicant: General Electric Company, Schenectady, NY (US)

(72) Inventors: Thomas Edward Johnson, Greer, SC (US); Larry Lou Thomas, Flat Rock, NC (US); Johnie Franklin McConnaughhay, Greenville, SC (US); Scott Robert Simmons, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 207 days.

(21) Appl. No.: 17/589,052

(22) Filed: Jan. 31, 2022

(65) Prior Publication Data

US 2022/0397061 A1 Dec. 15, 2022

Related U.S. Application Data

(60) Provisional application No. 63/151,038, filed on Feb. 18, 2021.

(51) Int. Cl.
*F02C 7/22* (2006.01)
*F02C 7/24* (2006.01)
*F16L 55/02* (2006.01)

(52) U.S. Cl.
CPC ............... *F02C 7/222* (2013.01); *F02C 7/24* (2013.01); *F16L 55/02* (2013.01)

(58) Field of Classification Search
CPC ..... F02C 7/222; F02C 7/24; F16L 55/02; F16L 55/0335; F05D 2260/96
See application file for complete search history.

(56) References Cited

U.S. PATENT DOCUMENTS

| 2,425,935 A | 8/1947 | Hayman |
| 3,223,214 A | 12/1965 | Kuivinen |

(Continued)

FOREIGN PATENT DOCUMENTS

| CN | 106704761 A | * | 5/2017 |
| CN | 206221807 U | * | 6/2017 |

(Continued)

OTHER PUBLICATIONS

Solidworks tech blog dated Oct. 24, 2018 titled "aircraft engine mount—frequency/vibration testing" by TPM, https://blogs.solidworks.com/tech/2018/10/aircraft-engine-mount-frequency-vibration-testing.html (Year: 2018).*

(Continued)

*Primary Examiner* — Terrell L McKinnon
*Assistant Examiner* — Ding Y Tan
(74) *Attorney, Agent, or Firm* — Dority & Manning, P.A.

(57) ABSTRACT

A vibration damper for a fuel conduit of a gas turbine combustor includes a mounting portion and a damping portion. The mounting portion is secured to the fuel conduit, and the damping portion includes a stack of damping washers, a bushing on top of the stack of damping washers, a spring clip secured around the stack of damping washers and the bushing, and a shoulder bolt disposed through the bushing and the stack of damping washers and engaged to the mounting portion.

17 Claims, 7 Drawing Sheets

(56) References Cited

U.S. PATENT DOCUMENTS

| | | | | |
|---|---|---|---|---|
| 5,271,588 | A * | 12/1993 | Doyle | F16L 3/237 |
| | | | | 248/68.1 |
| 5,273,249 | A * | 12/1993 | Peterson | F23R 3/283 |
| | | | | 248/901 |
| 7,757,494 | B2 * | 7/2010 | Duverneuil | F02C 7/222 |
| | | | | 60/800 |
| 8,963,399 | B2 * | 2/2015 | Tekawade | H02K 1/185 |
| | | | | 310/260 |
| 10,280,791 | B2 * | 5/2019 | Peters | F01D 25/04 |
| 11,028,728 | B2 * | 6/2021 | McGuire | F01D 25/164 |
| 2002/0069647 | A1 * | 6/2002 | Mayersky | F02C 7/222 |
| | | | | 60/734 |
| 2003/0115879 | A1 * | 6/2003 | Nishimura | F23R 3/002 |
| | | | | 60/725 |
| 2009/0200104 | A1 * | 8/2009 | Baum | F16L 55/0335 |
| | | | | 138/40 |
| 2011/0167830 | A1 * | 7/2011 | Bishara | F02M 55/00 |
| | | | | 60/740 |
| 2018/0058404 | A1 * | 3/2018 | Tibbs | F02M 61/167 |
| 2018/0187571 | A1 * | 7/2018 | Recuero | F02C 7/20 |
| 2019/0368788 | A1 * | 12/2019 | Hwang | F16L 55/035 |
| 2020/0300121 | A1 * | 9/2020 | McGuire | F01D 25/04 |

FOREIGN PATENT DOCUMENTS

| | | | | |
|---|---|---|---|---|
| EP | 0625662 | A1 | 11/1994 | |
| EP | 926436 | A2 * | 6/1999 | F23D 11/36 |
| GB | 2584148 | A * | 11/2020 | F01D 25/04 |

OTHER PUBLICATIONS

Donovan spring company U-bolt online page dated by web.archive.org: May 25, 2016, https://www.donovanspring.com/u-bolts.html (Year: 2016).*

International Search Report Corresponding to Application No. PCT/US2022/070706 on May 12, 2022.

* cited by examiner

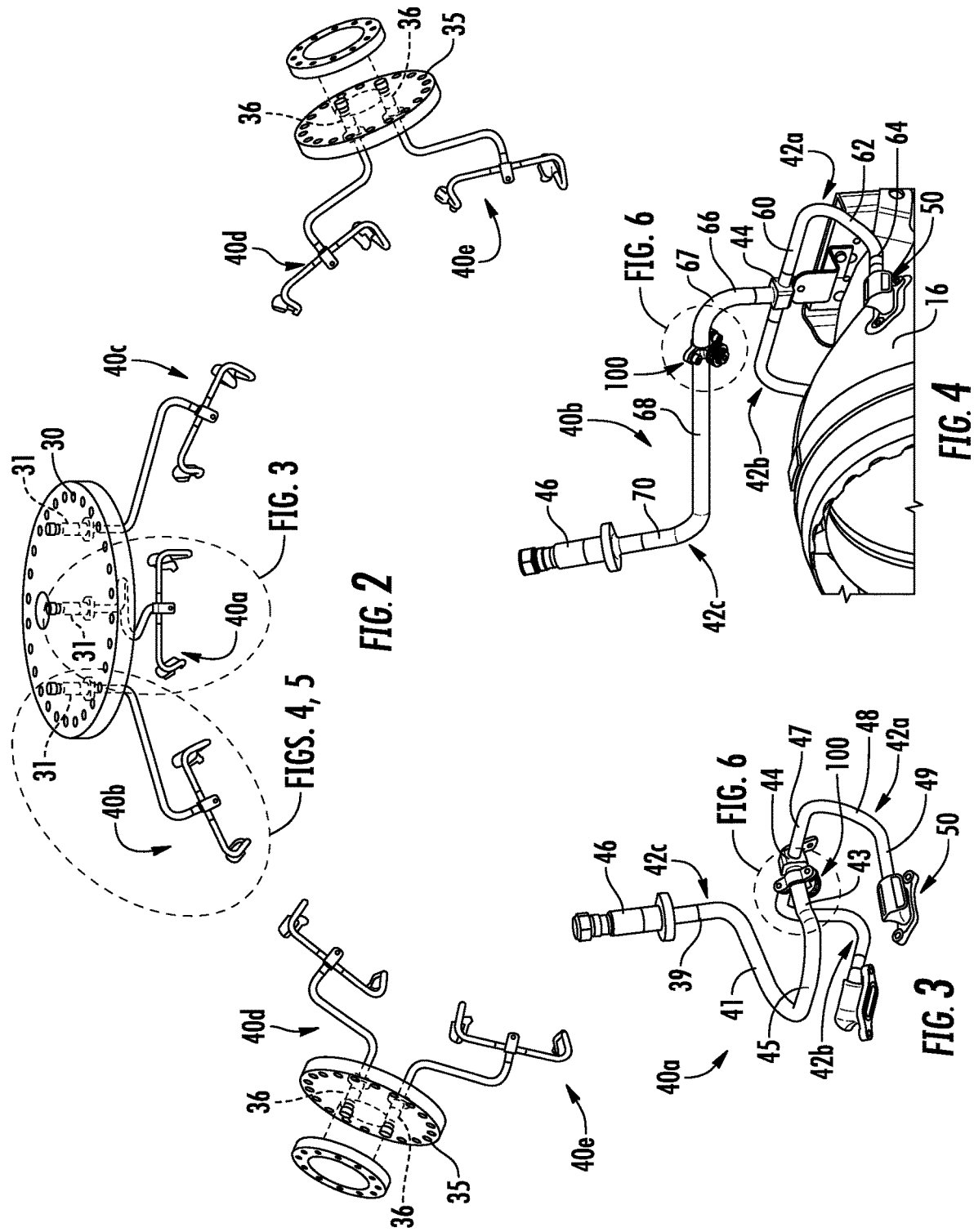

VIBRATION DAMPER FOR FLUID CONDUIT OF GAS TURBINE COMBUSTOR

PRIORITY STATEMENT

The present application claims priority to U.S. Provisional Patent Application Ser. No. 63/151,038 filed Feb. 18, 2021, which is incorporated by reference herein in its entirety.

TECHNICAL FIELD

The present disclosure relates generally to the field of gas turbines and, more particularly, to a vibration damper for a fluid conduit of a gas turbine combustor. Specifically, the present vibration damper may be used to dampen vibrations of a fuel conduit that is part of an axial fuel staging system of a gas turbine combustor.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles collectively define a turbine stage. As the rotating blades rotate the rotor of the gas turbine system, a generator, which is coupled to the rotor, may generate power from the rotation of the rotor. The rotation of the turbine blades also causes rotation of the compressor blades, which are coupled to the rotor.

Some combustion systems are provided with one or more fuel nozzles at a forward, or upstream, end of each can-annular combustor and a set of downstream fuel injectors at a location downstream of the one or more fuel nozzles. The downstream fuel injectors introduce fuel and air in a radial direction through the combustor liner or transition piece and into a secondary combustion zone, where the fuel and air are combusted with the combustion products produced by the one or more fuel nozzles. The fuel lines that supply fuel to the downstream fuel injectors are disposed with a high-pressure plenum that surrounds the combustion cans and, thus, are subjected to high temperatures and pressures as well as vibrations associated with operation of the gas turbine.

Previously, to accommodate the vibration of the fuel lines, some gas turbine manufacturers have used flexible fuel lines and/or fuel bellows. However, a more robust fuel delivery system is needed.

SUMMARY

A vibration damper for a fluid conduit of a gas turbine combustor includes a mounting portion and a damping portion. The mounting portion is secured to the fuel conduit, and the damping portion includes a stack of damping washers, a bushing on top of the stack of damping washers, a spring clip secured around the stack of damping washers and the bushing, and a shoulder bolt disposed through the bushing and the stack of damping washers and engaged to the mounting portion.

A fluid conduit for a gas turbine combustor includes a plurality of tubes connected to one another and subject to vibrations. A vibration damper is affixed to one of the plurality of tubes. The vibration damper includes a mounting portion secured to the fluid conduit. The vibration damper further includes a damping portion having a stack of damping washers, a bushing on top of the stack of damping washers, a spring clip secured around the stack of damping washers and the bushing, and a shoulder bolt disposed through the bushing and the stack of damping washers and engaged to the mounting portion.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which:

FIG. 2 is a perspective view of a partial circumferential arrangement of axial fuel staging conduits, which may be provided with the present vibration damper, according to aspects of the present disclosure;

FIG. 3 is a perspective view of a first embodiment of an axial fuel staging conduit, which is provided with the present vibration damper in a first location and orientation;

FIG. 4 is a perspective view of a second embodiment of an axial fuel staging conduit, which is provided with the present vibration damper in a second location and orientation;

DETAILED DESCRIPTION

Figure 1:
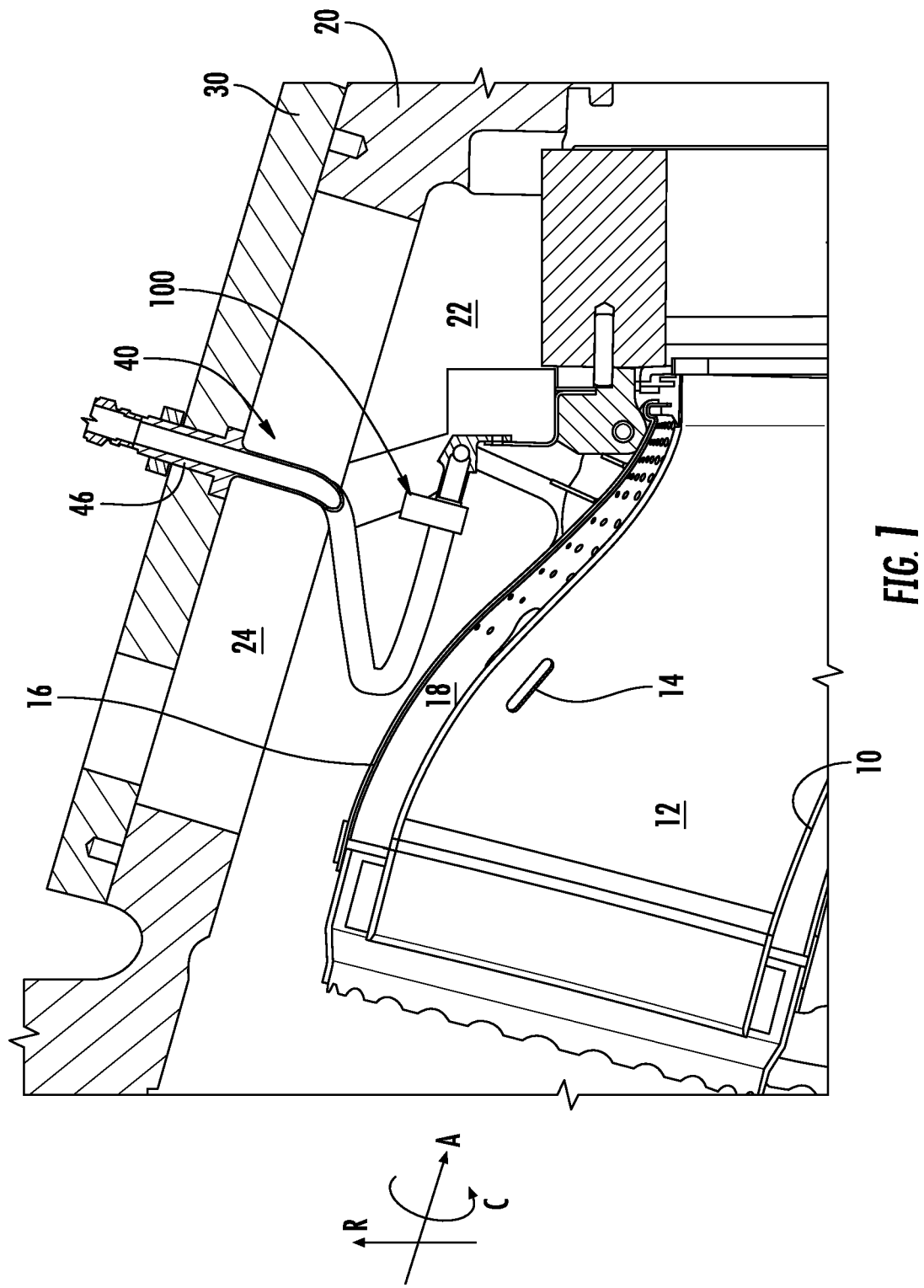
FIG. 1 is a side perspective view of a downstream portion of a combustion can having an axial fuel staging system, according to the present disclosure.
Figure 6:
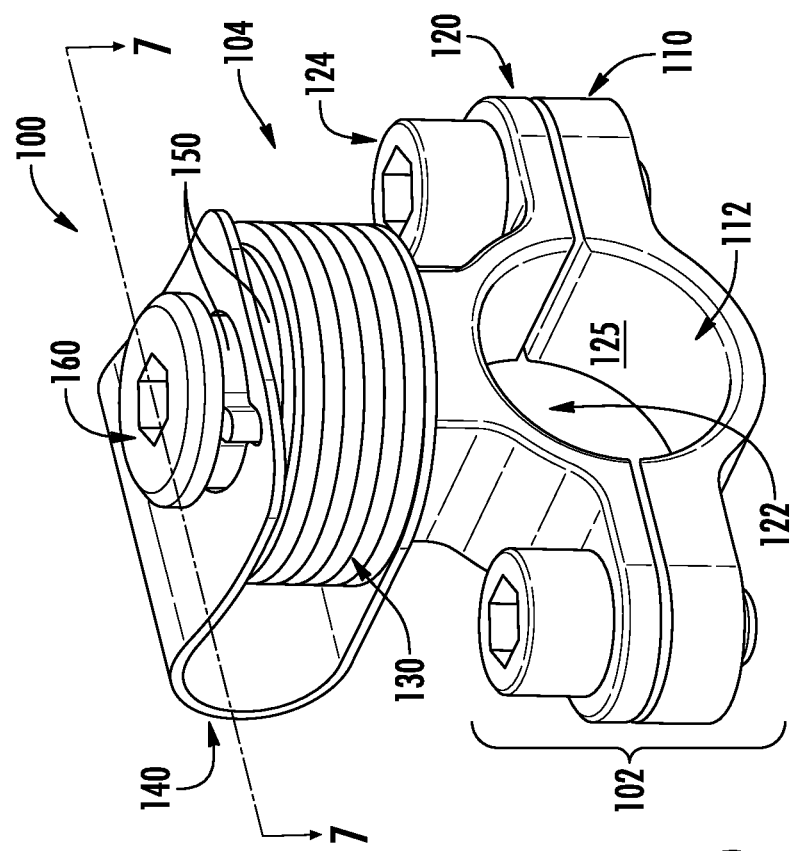
FIG. 6 is a perspective view of the vibration damper of the present disclosure, as may be used with the axial fuel staging conduits of FIGS. 2 through 5.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current vibration damper for an axial fuel staging conduit of a gas turbine combustor, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft, while the term "outer" is used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "about" or "approximately", when used to specify dimensions, distances, or quantities, means the stated value, plus or minus 10 percent.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a vibration damper for a fuel supply line of an axial fuel staging (i.e., downstream) system for a combustor of a land-based power-generating gas turbine for purposes of illustration, one of ordinary skill in the art will readily appreciate that embodiments of the present disclosure may be applied to other locations within a combustor and are not limited to combustor components for land-based power-generating gas turbines, unless specifically recited in the claims.

Referring now to the drawings, FIG. 1 is a side perspective view of a downstream portion of a combustor for a gas turbine engine. The combustor includes a liner (not shown) that defines a primary combustion zone where fuel and air introduced by the upstream fuel nozzles are combusted. The combustor further includes a transition piece 10 that has an upstream end configured to join to the liner and a downstream end axially spaced from the upstream end that is configured to join to the turbine section of the gas turbine. The transition piece 10 defines a secondary combustion zone 12 where fuel and air from downstream fuel injectors 50 (shown in FIGS. 3 and 4) are combusted. The transition piece 10 includes an opening 14 defined through the transition piece 10, which mates with the fuel injectors 50 for receiving the fuel and air.

An impingement sleeve 16 surrounds the transition piece 10, such that an annulus 18 is defined between the transition piece 10 and the impingement sleeve 16. A casing 20 (such as a compressor discharge casing) is disposed around each combustor of an array of combustors in the gas turbine, which circumferentially surround a centerline of the gas turbine. The casing 20 defines a high-pressure, high-temperature plenum 22. Air received from a compressor of the gas turbine at an elevated pressure and temperature (relative to atmospheric air at ambient temperature) flows through the plenum 22 through a plurality of openings in the impingement sleeve 16 of each combustor and into each respective annulus 18 where the air is used for cooling the transition piece 10 and the liner, as the air is conveyed to the upstream fuel nozzles (not shown).

The casing 20 includes a plurality of openings along its outer surface, such as manway openings 24 or air extraction ports (not shown). Each manway opening 24 has a manway cover 30 (FIGS. 1 and 2), and the air extraction ports have respective air extraction covers 35 (FIG. 2). The covers 30, 35 include openings 31, 36 to provide entry points for a plurality of axial fuel conduits 40, which are used to deliver fuel to the axial fuel injectors 50 of each combustor.

In the exemplary arrangement shown in FIG. 2, three axial fuel conduits 40a, 40b, 40c are disposed through spaced openings 31 in the manway cover 30, while two axial fuel conduits 40d, 40e are disposed through respective openings 36 in each of two air extraction covers 35 that are circumferentially spaced from the manway cover 30. Each axial fuel staging conduit 40 provides fuel to a pair of axial fuel staging injectors 50 for a single combustion can. Collectively, the seven axial fuel conduits supply fuel to the axial fuel staging injectors 50 of seven combustion cans, which represent the upper half of the combustion cans of the combustion section of a gas turbine engine. A corresponding set of conduits 40 provides fuel to the seven combustion cans on the lower half of the combustion system. Other gas turbine engines may have other numbers of combustion cans, and the principles described herein are equally applicable to different numbers or arrangements of axial fuel staging conduits 40.

As shown in FIG. 2, conduits 40a through 40e may extend between the axial fuel staging injectors 50 and one of the manway covers 30 or the air extraction port covers 35. Each conduit 40 has a fuel fitting 46 and a plurality of rigid fuel pipes 42a, 42b, and 42c that are coupled together at a T-junction 44. Rigid pipes 42a and 42b extend from the T-junction 44 to oppositely disposed axial fuel staging injectors 50, and rigid pipe 42c extend from the T-junction 44 to the fuel fitting 46. The fuel fitting 46 is configured to extend through the respective manway cover 30 or air extraction port cover 35. Rigid pipes 42a, 42b, and 42c are provided with various bends and/or elbows to accommodate connection to the axial fuel staging injectors 50 on each combustor of the circumferential array of combustors. In the exemplary embodiment that has been illustrated, it has been found that five different pipe configurations are capable of delivering fuel to the axial fuel staging injectors 50 of the fourteen combustion cans.

By grouping at least two fuel conduits 40 through a respective cover 30, 35, the delivery of the fuel is optimized within the available space and takes advantage of the pre-existing architecture of the casing 20 without necessitating the introduction of any additional penetrations of the casing 20 for the fuel conduits 40 and/or fuel fittings 46.

FIG. 3 illustrates an axial fuel staging conduit 40a that is disposed at the center of the manway cover 30. As described above, the T-junction 44 is disposed centrally between the first tube 42a and the second tube 42b. The tubes 42a, 42b connect to respective axial fuel staging injectors 50. Each tube 42a, 42b includes a first portion 47 that extends in a transverse direction away from the T-junction 44, a second portion 48 that extends in a radially inward direction from the first portion 47, and a third portion 49 that extends in a generally axial direction from the second portion. The tube 42c includes a first portion 43 that extends from the T-junction in a generally axial direction, a second portion 45 that extends in a transverse direction from the first portion 43, a curved third portion 41 that extends in a generally axial direction (opposite the direction of the first portion 43) and in a radially outward direction, and a fourth portion 39 that extends in a radially outward direction from the third portion 41 to the fuel fitting 46. The vibration damper 100, as described herein, is positioned on the first portion 43 of the tube 42c proximate to the T-junction 44 with a clamp portion of the vibration damper 100 being positioned in a radially outward direction (although not necessarily in an orientation that is parallel to the first portions 47 of the tubes 42a, 42b). This position and orientation of the vibration damper 100 may advantageously optimize the damping effectiveness of the vibrational damper 100 on the axial fuel staging conduit 40a during operation of the gas turbine system. For example, this position and orientation may be advantageous over other positions and/or orientations due to the vibrational damper 100 having increased damping effectiveness during operation of the gas turbine system.

Figure 5:
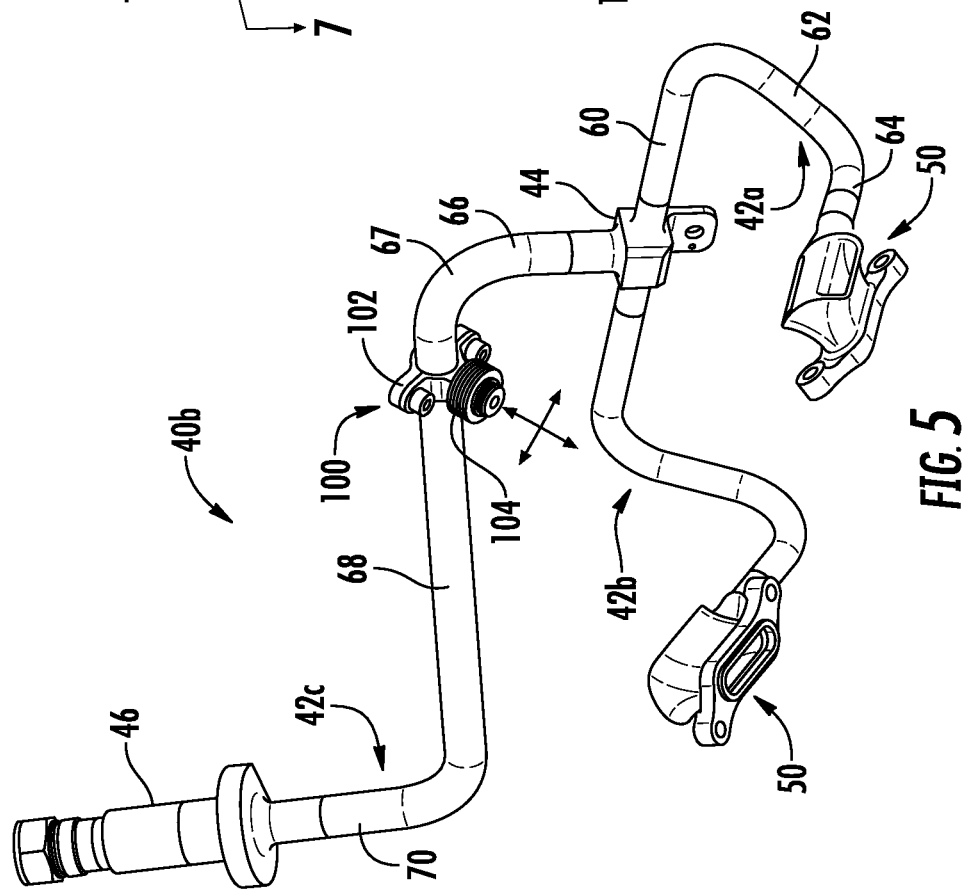
FIG. 5 is a perspective view of the axial fuel staging conduit and vibration damper of FIG. 4.
Figure 7:
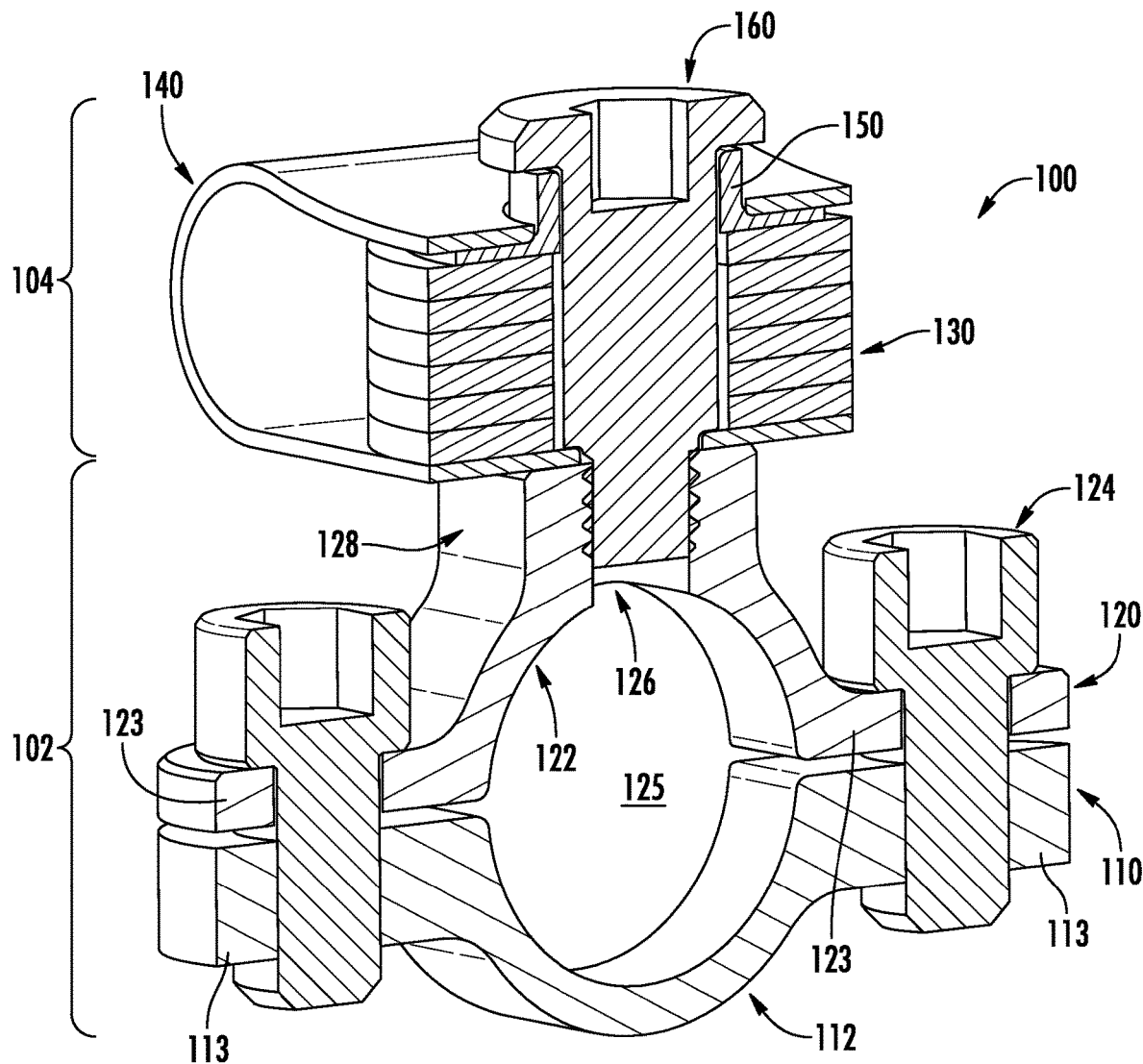
FIG. 7 is a cross-sectional perspective view of the vibration damper of the present disclosure, as taken along line 7-7 of FIG. 6.

FIGS. 4 and 5 illustrate an axial fuel staging conduit 40b that is disposed along the left side of the manway cover 30. FIG. 4 further illustrates the position of the axial fuel staging injectors 50 on the exterior surface of the impingement sleeve 16. As described above with reference to FIG. 3, the T-junction 44 is disposed centrally between the first tube 42a and the second tube 42b. The tubes 42a, 42b connect to respective axial fuel staging injectors 50. Each tube 42a, 42b includes a first portion 60 that extends in a transverse direction away from the T-junction 44, a second portion 62 that extends in a radially inward direction from the first portion 60, and a third portion 64 that extends in a generally axial direction from the second portion 62.

The tube 42c includes a first portion 66 that extends from the T-junction in a generally radial direction, a curved second portion 67 that turns the flow path from a generally radial direction to a generally transverse direction, a third portion 68 that extends in a transverse direction from the curved second portion 67, and a fourth portion 70 that extends in a radially outward direction from the third portion 68 to the fuel fitting 46. The vibration damper 100, as described herein, may be positioned on the third portion 68 of the tube 42c proximate to the curved second portion 67 (e.g., about 1 inch or 2.54 cm from the curved "elbow" portion) with a clamp portion of the vibration damper 100 being positioned at an oblique angle relative to the third portion 68 of the tube 42c. This position and orientation of the vibration damper 100 may advantageously optimize the damping effectiveness of the vibrational damper 100 on the axial fuel staging conduit 40b during operation of the gas turbine system. For example, this position and orientation may be advantageous over other positions and/or orientations due to the vibrational damper 100 having increased damping effectiveness during operation of the gas turbine system.

For each axial fuel staging conduit 40, the vibration damper 100 is positioned at a location and with an orientation of the damper 100, which is optimized to minimize vibrations driven by different vibration mode shapes. As will be discussed herein, the vibration damper 100 includes a stack of washers whose controlled movement dissipates the vibrations associated with various operating modes of the combustor. For example, the primary vibration mode dissipated by the vibration damper 100 is generally transverse with respect to the fuel conduit 40b. Damping washers 132 within a damper stack 130 are arranged in a manner that permits the washers 132 to move up-and-down, as well as side-to-side, relative to adjacent washers 132, as shown by the double-headed arrows in FIG. 5.

The vibration damper 100 is discussed further with reference to FIGS. 6 through 13. The vibration damper 100 includes a clamping or mounting portion 102 and a damping portion 104.

The mounting portion 102 may couple the vibration damper 100 to a conduit. In some embodiments (not shown), the mounting portion 102 may be a boss or protrusion defined by the vibration damper 100 (or the conduit), and the damping portion 104 may be fixedly coupled to the boss or protrusion, such as via welding or other means. In exemplary embodiments, as shown, the mounting portion 102 includes a first clamping plate 110 having a central arcuate portion 112 flanked by flanges 113. Each of the flanges 113 defines an aperture 114 through the flange 113 for receipt of a cap-head screw 124. A second clamping plate 120 is complementary in size and shape to the first clamping plate 110. The second clamping plate 120 has a central arcuate portion 122 flanked by flanges 123 with apertures defined therethrough (not separately numbered) that align with the apertures 114 defined in the flanges 113. A connection body 128 extends outward or upward from the central arcuate portion 122 of the second clamping plate 120 and includes a threaded opening 126 that extends from the top (outer surface) of the connection body 128 of the second clamping plate 120 to the inner surface of the central arcuate portion 122 (see FIGS. 7 and 11).

When the second clamping plate 120 is coupled to the first clamping plate 110, via the cap-head screws 124, a full circular annulus 125 is defined by the central arcuate portions 112, 122. The full circular annulus 125 is sized to fit around a respective tube 42 of the axial fuel staging conduit 40. In the process of installing the vibration damper 100 at the predetermined location on the axial fuel staging conduit 40, the first and second clamping plates 110, 120 are disposed around a respective tube 42 and are coupled together by the screws 124. While the clamping force exerted by the screws 124 is typically sufficient, one or both of the clamping plates 110, 120 may optionally be fixedly coupled to the tube 42 (e.g., welded at the central arcuate portion 122). For added durability, a weld may be disposed at the exit ends of the cap-head screws 124.

The damping portion 104 of the vibration damper 100 includes a C-shaped spring clip 140, which surrounds a stack 130 of damping washers 132. A flanged bushing 150 is positioned on the top of the stack 130 of damping washers 132 to provide durability against wear caused by movement of the damping washers 132 in response to combustion vibrations. The damping portion 104 also includes a shoulder bolt 160 that is positioned through the spring clip 140 and the damping washers 132 and that is threaded into the connection flange 128 of the second clamping plate 120.

The spring clip 140 (shown in more detail in FIG. 13) includes a first (top) surface 141, a second (bottom) surface 143, and a curved surface 145 that connects the first surface 141 to the second surface 143. The top surface 141 includes a first portion 141a that is contiguous with the curved surface 145 and a second portion 141b that is distal to the curved surface 145. The first portion 141a slopes inwardly toward an aperture 146 defined therethrough, while the second portion 141b slopes, or flares, outwardly from the aperture and away from the bushing 150 (see FIG. 11). The aperture 146 is generally circular, except for a locking recess 142 that extends from the aperture 146. The bottom surface 143 of the spring clip 140 is planar and includes an aperture 148 that is aligned with the aperture 146 in the top surface 141. The aperture 148 may have a diameter that is smaller than a diameter of the aperture 146. In this way, the aperture 146 may be sized to receive a cylindrical body portion 164 of the shoulder bolt 160, and the aperture 148 may be sized to receive a threaded end 166 of the shoulder bolt 160. A distal portion of the bottom surface 143 defines a pin opening 144 therethrough, as will be discussed further herein. The top surface 141 of the spring clip 140 is biased toward the bottom surface 143, such that the top surface 141 must be pulled upward to engage the stack 130 of the damping washers 132.

Figure 8:
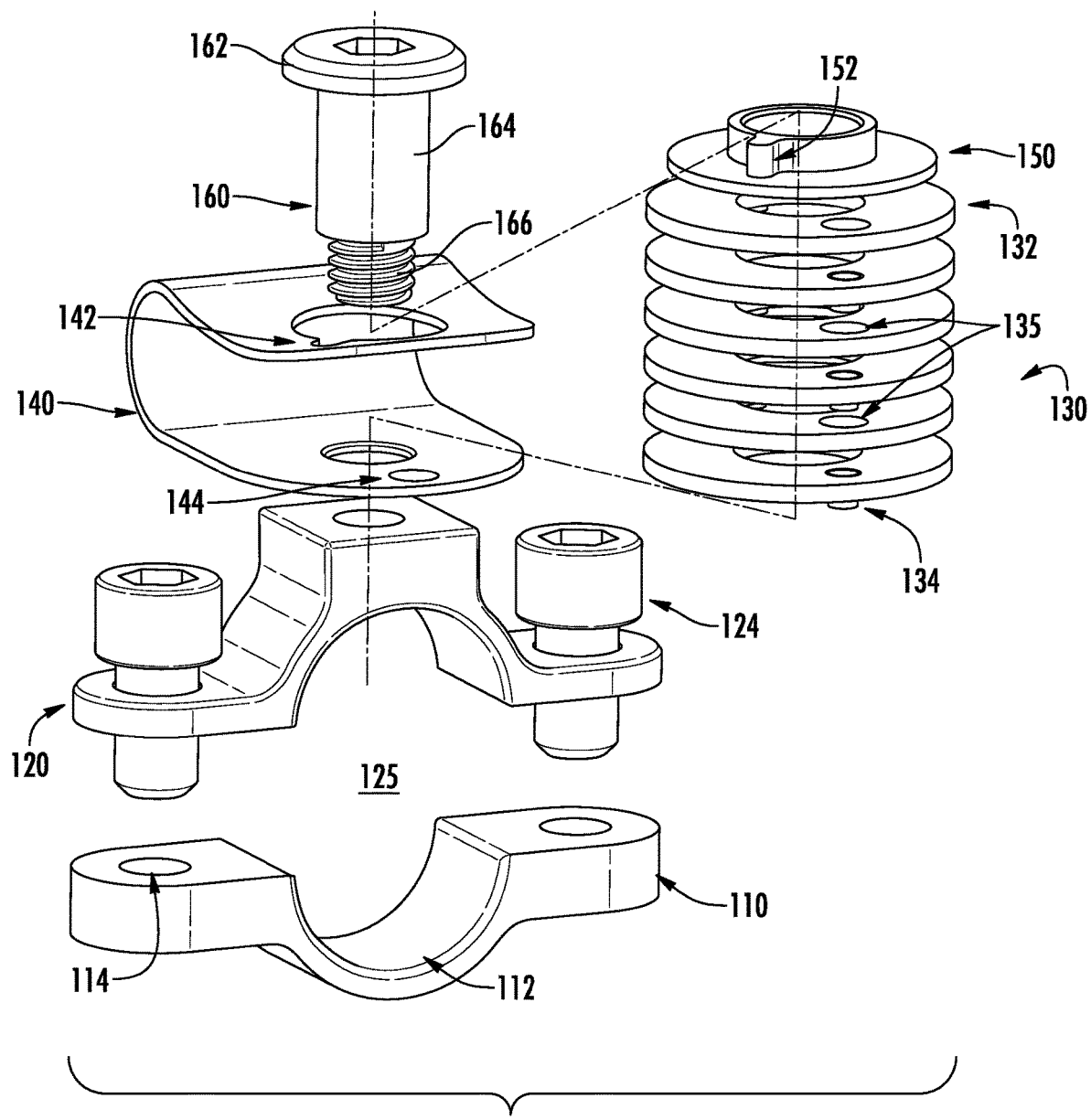
FIG. 8 is an exploded view of the vibration damper of the present disclosure.
Figure 12:
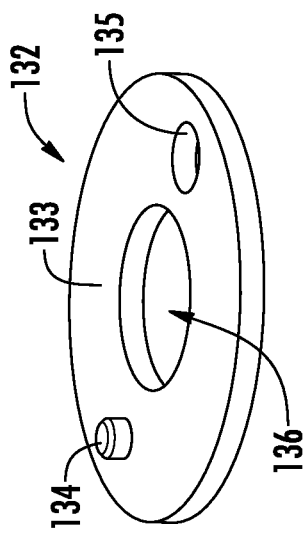
FIG. 12 is a perspective view of a bottom surface of a single damping washer as used in the present vibration damper.
Figure 13:
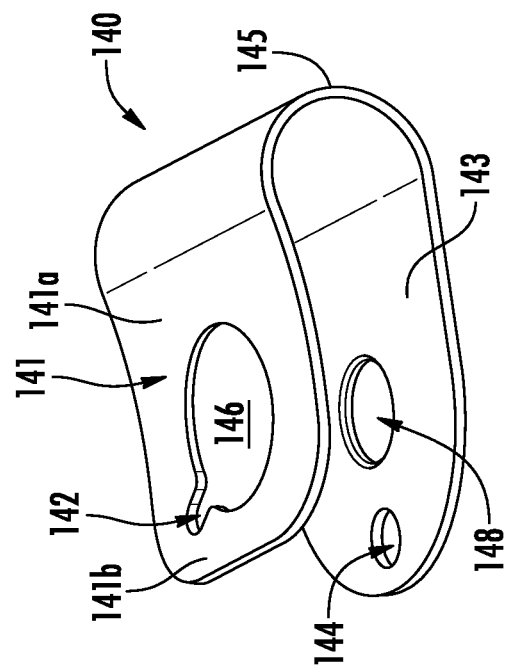
FIG. 13 is a perspective view of a spring clip as used in present vibration damper.
Figure 11:
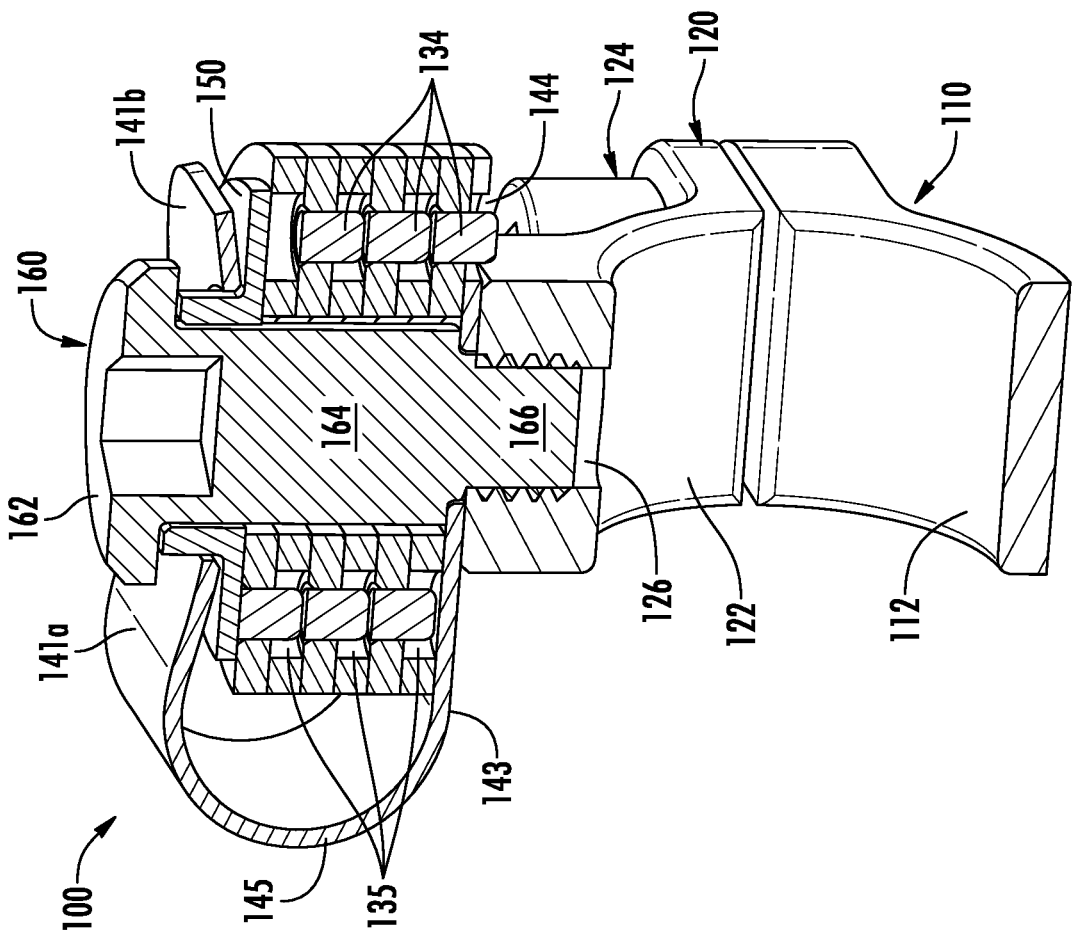
FIG. 11 is a cross-sectional perspective view of the vibration damper of the present disclosure.

The stack 130 of the damping washers 132 is shown most clearly in FIGS. 8 and 11, and the bottom surface of an individual damping washer 132 is shown in FIG. 12. Each damping washer 132 includes a body 133 having a circular shape and a planar profile. A central aperture 136 is defined through the body 133. A locking pin 134 is welded, affixed, or integral with the body 133. For example, in some embodiments, each body 133 and a respective locking pin 134 may be a singular, unitary, integrally formed body. A pin recess 135, which has a larger diameter than the locking pin 134, is defined opposite the locking pin 133 along a diameter of the body 133.

As shown in FIGS. 8 and 11, a stack 130 of damping washers 132 is assembled by inserting the locking pin 134 of a first washer 132 into the pin recess 135 of an adjacent second washer 132. The locking pin 134 of the second washer 132 is then inserted into the pin recess 135 of an adjacent third washer 132. This pattern continues for the number of washers 132 in the stack 130. In the illustrated exemplary embodiment, the stack 130 includes six washers 132. The locking pin 134 of the washer 132 at the bottom of the stack 130 is inserted into the pin recess 144 of the bottom surface 143 of the spring clip 140 (as shown in FIG. 11) to prevent rotation of the stack 130 of damping washers 132. The locking pin 134 and pin recess 135 may advantageously prevent rotational movement or spin between the damping washers 132 when assembled as a stack 130, thereby greatly reducing frictional wear and limiting the damper stack 130 to axial movement (which provides vibrational damping to the conduit).

Figure 10:
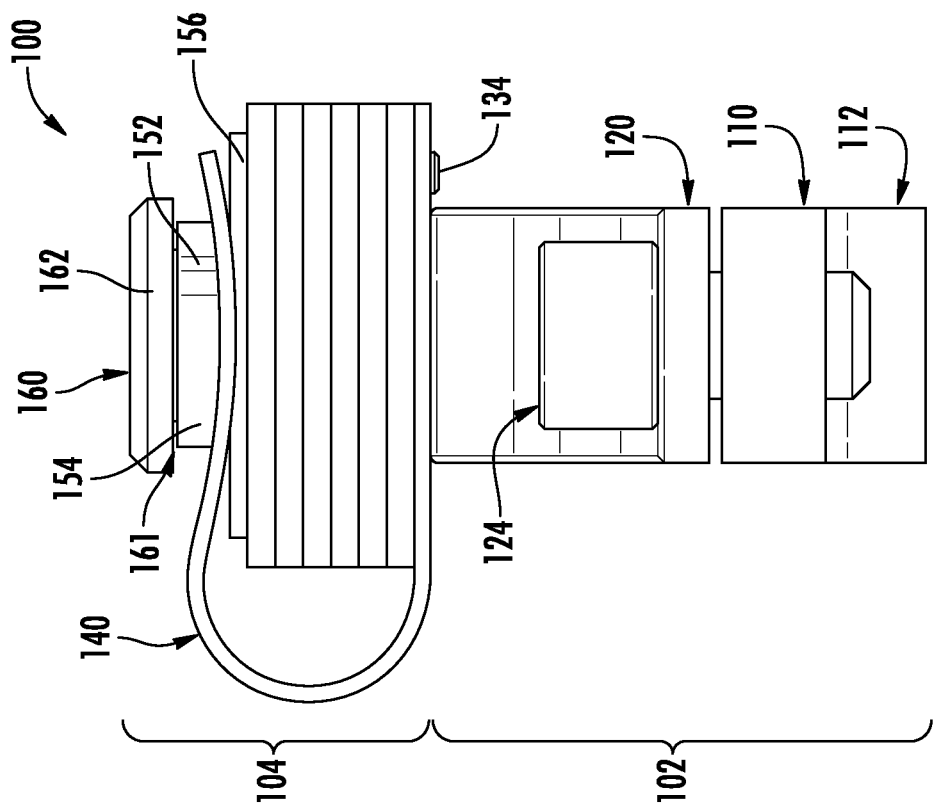
FIG. 10 is a side view of the vibration damper of the present disclosure.
Figure 9:
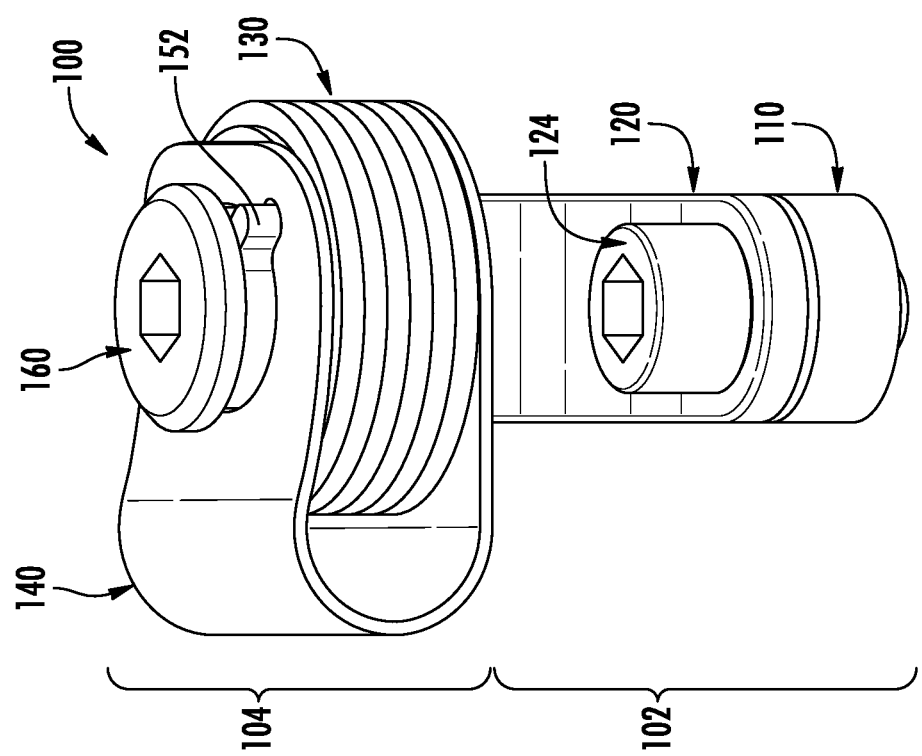
FIG. 9 is a side perspective view of the vibration damper of the present disclosure.

As shown in FIGS. 9 and 10, the bushing 150 may have an exterior surface that corresponds in shape to the aperture 146 and locking recess 142 defined in the spring clip 140. For example, the bushing 150 includes a cylindrical portion 154 from which a locking tab 152 extends and a planar portion 156 having a diameter larger than the diameter of the cylindrical portion 154. The planar portion 156 has a diameter that is smaller than the diameter of the damping washer 132. The locking tab 152 is sized and shaped to fit within the locking recess 142 of the top surface 141 of the spring clip 140.

In assembling the damping portion 104 of the vibration damper 100, the bushing 150 is positioned on top of the stack 130 with the planar portion 156 contacting the stack 130. The cylindrical portion 154 and locking tab 152 of the bushing 150 are positioned through the aperture 146 and locking recess 142 of the top surface 141 of the spring clip 140 to prevent rotation of the bushing 150 and the stack 130. The top surface 141 of the spring clip 140 is biased toward the bottom surface 143 of the spring clip 140, such that the biasing force helps to secure the damping washers 132.

As shown in FIG. 11, the shoulder bolt 160 is disposed through an opening (not numbered) in the bushing 150 and extends through the central apertures 136 of the damping washers 132. The shoulder bolt 160 includes a head portion 162 having a first diameter, a cylindrical body portion 164 having a second diameter greater than the first diameter, and a threaded portion 166 having a third diameter smaller than the first diameter and the second diameter. The threaded end 166 of the shoulder bolt 160 engages the threaded opening 126 of the connection portion 128 of the second clamping plate 120, thus securing the damping portion 104 to the mounting portion 102 of the vibration damper 100.

As shown best in FIG. 10, an axial gap 161 may be defined between the shoulder bolt 160 and the locking tab 152. Particularly, the axial gap 161 may be defined between the head portion 162 of the shoulder bolt 160 and the locking tab 152. The axial gap 161 may advantageously prevent the damping portion 104 from experiencing bind and/or may reduce large scale axial deflection.

For durability, the bodies 133 of the damping washers 132, the spring clip 140, the bushing 150, and the shoulder bolt 160 are made of a wear-resistant material, such as a cobalt material (e.g., L605). In some instances, it may be desirable to pre-oxidize the bushing 150. The other components (e.g., the clamping plates 110, 120 and the cap-head screws 124) may be made from any materials that meet the durability requirements at the operating conditions of the gas turbine. Typical materials include stainless steels and nickel-based alloys.

During operation of the gas turbine, the combustors will experience vibratory stresses that can adversely affect the axial fuel staging conduits 40. The vibration dampers 100 of the present disclosure are located and oriented along the conduits 40, such that the washer stack 130 is positioned to experience the greatest vibratory stresses. The washers 132 of the stack 130 are able to move in sliding relationship to one another with the movement being limited by the relative sizes of the locking pin 134 in the pin recesses 135, 144. The washers 132 of the stack 130 are also able to move in an up-and-down relationship to one another due to the spacing of the locking pins 134 in the pin recesses 135, 144. Such movements help to dampen the vibrations experienced by the fuel conduits 40, thereby ensuring the durability of such components for a prescribed lifecycle and reducing the likelihood of cracks or leakage of the conduits 40.

Advantages of the present vibration damper 100 include: (i) that the vibration damper 100 can operate in hot environment outside of the range of non-metallic materials; (ii) that the anti-rotation features (i.e., pins, recesses) have been proven effective in testing; (iii) that the spring clip load can be tuned and has a very large compliant range; (iv) that the spring clip has a large bearing area compared to a conventional spring, which minimizes wear; (v) that the vibration damper has a compact design necessary for packaging inside the casing of the gas turbine; (vi) that the vibration damper provides a high amount of damping with minimal weight; and (vii) that the location and orientation of the vibration damper can be optimized via FEA analysis.

Exemplary embodiments of the vibration damper for a fuel conduit for a gas turbine combustor are described above in detail. The vibration damper described herein is not limited to the specific embodiments described herein, but rather, components of the vibration damper may be utilized independently and separately from other components described herein. For example, the vibration damper described herein may have other applications not limited to practice with axial fuel staging conduits for combustors of power-generating gas turbines, as described herein. Rather, the vibration dampers described herein can be implemented and utilized for delivery of various fluids in a gas turbine or in various other industries where the fluid conduit is subjected to vibrations.

While the technical advancements have been described in terms of various specific embodiments, those skilled in the art will recognize that the technical advancements can be practiced with modification within the spirit and scope of the claims.

Further aspects of the invention are provided by the subject matter of the following clauses:

A vibration damper for a fluid conduit of a gas turbine combustor, the vibration damper comprising: a mounting portion secured to the fluid conduit; and a damping portion, the damping portion including: a stack of damping washers, a bushing on top of the stack of damping washers, a spring clip secured around the stack of damping washers and the bushing, and a shoulder bolt disposed through the bushing and the stack of damping washers and engaged to the mounting portion.

The vibration damper of one or more of these clauses, wherein the bushing includes a cylindrical portion and a locking key projecting therefrom; and wherein the spring clip includes a top surface defining an aperture with a locking recess, the aperture and the locking recess being sized to correspond to the cylindrical portion and the locking key and being aligned such that the top surface of the spring clip fits over the cylindrical portion and the locking key.

The vibration damper of one or more of these clauses, wherein each damping washer of the stack of damping washers comprises a circular body having a central aperture, a pin projecting from a bottom surface thereof, and a locking aperture defined therethrough, the locking aperture being opposite the pin across a diameter of the circular body.

The vibration damper of one or more of these clauses, wherein the pin has a first diameter and the locking aperture has a second diameter larger than the first diameter.

The vibration damper of one or more of these clauses, wherein the pin of a first damping washer is inserted in the locking aperture of an adjacent second damping washer; and wherein the pin of the second damping washer is inserted in the locking aperture of a third damping washer adjacent the second damping washer; and wherein the pin of a last damping washer in the stack of damping washers opposite the first damping washer is disposed in a locking aperture defined through a bottom surface of the spring clip.

The vibration damper of one or more of these clauses, wherein the shoulder bolt has a cylindrical body disposed through the central apertures of the damping washers of the stack of damping washers.

The vibration damper of one or more of these clauses, wherein the spring clip has a top surface and a bottom surface connected to the top surface by a curved surface; wherein the top surface and the bottom surface each define an aperture therethrough, the apertures being aligned with each other.

The vibration damper of one or more of these clauses, wherein the bottom surface is planar and is configured to be disposed on a connection body of the mounting portion.

The vibration damper of one or more of these clauses, wherein the top surface includes a first portion connected to or contiguous with the curved portion and a second portion distal to the curved portion; wherein the first portion slopes radially inwardly from the curved portion toward the aperture; and wherein the second portion slopes radially outwardly from the aperture and away from the bushing.

The vibration damper of one or more of these clauses, wherein the bottom surface defines a locking aperture configured to receive a locking pin from a bottom damping washer of the stack of damping washers.

The vibration damper of one or more of these clauses, wherein the mounting portion includes a first clamping plate and a second clamping plate, each of the first clamping plate and the second clamping plate has a central arcuate portion flanked by flanges, the central arcuate portion of the first clamping plate being aligned with the central arcuate portion of the second clamping plate to define a full circular annulus, the full circular annulus being sized to fit around the fluid conduit.

The vibration damper of one or more of these clauses, wherein each of the flanges defines an aperture through the flange for receipt of a cap-head screw; and wherein a first cap-head screw extends through a first aperture of the first clamping plate and a corresponding first aperture of the second clamping plate; and wherein a second cap-head screw extends through a second aperture of the first clamping plate and a corresponding second aperture of the second clamping plate.

The vibration damper of one or more of these clauses, wherein the distal ends of the cap-head screws are welded in position after being disposed through the respective apertures in the first and second clamping plates.

The vibration damper of one or more of these clauses, wherein the second clamping plate comprises a connection body that extends outward or upward from the central arcuate portion of the second clamping plate and that includes a threaded opening, the threaded opening extending from the top of the connection body to the inner surface of the central arcuate portion of the second clamping plate.

A fluid conduit for a gas turbine combustor, wherein the fluid conduit comprises a plurality of tubes connected to one another and subject to vibrations; and wherein a vibration damper is affixed to one of the plurality of tubes, the vibration damper comprising: a mounting portion secured to the fluid conduit; and a damping portion, the damping portion including: a stack of damping washers, a bushing on top of the stack of damping washers, a spring clip secured around the stack of damping washers and the bushing, and a shoulder bolt disposed through the bushing and the stack of damping washers and engaged to the mounting portion.

The fluid conduit of one or more of these clauses, wherein the plurality of tubes comprises three tubes; and wherein the three tubes are joined at a T-junction.

The fluid conduit of one or more of these clauses, wherein the plurality of tubes comprises a first tube in fluid communication through a gas turbine casing with a fuel supply; a second tube in fluid communication with the first tube and coupled to a first axial fuel staging injector mounted to a combustor; and a third tube in fluid communication with the first tube and couples to a second axial fuel staging injector of the combustor.

The fluid conduit of one or more of these clauses, wherein the plurality of tubes is disposed within a compressor discharge casing that defines a high-pressure, high-temperature plenum.

The fluid conduit of any of one or more of these clauses, wherein the vibration damper is positioned immediately adjacent to the T-junction on the first tube.

The fluid conduit of any of one or more of these clauses, wherein the first tube includes a first portion extending from the T-junction, a curved elbow portion extending from the first portion, a third portion extending from the curved portion; and wherein the vibration damper is positioned on the third portion about an inch from the curved elbow portion.

What is claimed is:

1. A vibration damper for a fluid conduit of a gas turbine combustor, the vibration damper comprising:
   a mounting portion secured to the fluid conduit; and
   a damping portion, the damping portion including:
   a stack of damping washers, wherein each damping washer of the stack of damping washers comprises a body having a central aperture, a pin projecting from a bottom surface thereof, and a locking aperture defined therethrough, the locking aperture being opposite the pin across a diameter of the body, wherein the pin has a first diameter, and the locking aperture has a second diameter larger than the first diameter, wherein the pin of a first damping washer is inserted in the locking aperture of an adjacent second damping washer, and wherein the pin of the second damping washer is inserted in the locking aperture of a third damping washer adjacent the second damping washer;
   a bushing on top of the stack of damping washers;
   a spring clip secured around the stack of damping washers and the bushing, wherein the pin of a bottom damping washer in the stack of damping washers opposite the first damping washer is disposed in a locking aperture defined through a bottom surface of the spring clip; and
   a shoulder bolt disposed through the bushing, the spring clip, and the stack of damping washers and engaged to the mounting portion.

2. The vibration damper of claim 1, wherein the shoulder bolt has a cylindrical body disposed through the central apertures of the damping washers of the stack of damping washers.

3. The vibration damper of claim 1, wherein the spring clip has a top surface and a bottom surface connected to the top surface by a curved surface; wherein the top surface and the bottom surface each define an aperture therethrough, the apertures being aligned with each other.

4. The vibration damper of claim 3, wherein the bottom surface is planar and is configured to be disposed on a connection body of the mounting portion.

5. The vibration damper of claim 3, wherein the top surface includes a first portion connected to or contiguous with a curved portion and a second portion distal to the curved portion; wherein the first portion slopes radially inwardly from the curved portion toward the aperture; and wherein the second portion slopes radially outwardly from the aperture and away from the bushing.

6. The vibration damper of claim 3, wherein the bottom surface defines a locking aperture configured to receive a locking pin from a bottom damping washer of the stack of damping washers.

7. The vibration damper of claim 1, wherein the mounting portion includes a first clamping plate and a second clamping plate, each of the first clamping plate and the second clamping plate has a central arcuate portion flanked by flanges, the central arcuate portion of the first clamping plate being aligned with the central arcuate portion of the second clamping plate to define a full circular annulus, the full circular annulus being sized to fit around the fluid conduit.

8. The vibration damper of claim 7, wherein each of the flanges defines an aperture through the flange for receipt of a cap-head screw having a cap-head and a distal end opposite the cap-head; and wherein a first cap-head screw extends through a first aperture of the first clamping plate and a corresponding first aperture of the second clamping plate; and wherein a second cap-head screw extends through a second aperture of the first clamping plate and a corresponding second aperture of the second clamping plate.

9. The vibration damper of claim 8, wherein the distal ends of the first and second cap-head screws are welded in position after being disposed through the respective apertures in the first and second clamping plates.

10. The vibration damper of claim 8, wherein the second clamping plate comprises a connection body that extends outward or upward from the central arcuate portion of the second clamping plate and that includes a threaded opening, the threaded opening extending from the top of the connection body to the inner surface of the central arcuate portion of the second clamping plate, wherein the shoulder bolt is threadingly engaged with the threaded opening.

11. A fluid conduit for a gas turbine combustor comprising:
   a plurality of tubes connected to one another and subject to vibrations; and
   a vibration damper affixed to one of the plurality of tubes, the vibration damper comprising:
   a mounting portion secured to the fluid conduit; and
   a damping portion, the damping portion including:

a stack of damping washers;

a bushing on top of the stack of damping washers;

a spring clip secured around the stack of damping washers and the bushing, wherein the spring clip has a top surface and a bottom surface connected to the top surface by a curved surface, wherein the top surface and the bottom surface each define an aperture therethrough, the apertures being aligned with each other, wherein the bottom surface is planar and is configured to be disposed on a connection body of the mounting portion, wherein the top surface includes a first portion connected to or contiguous with a curved portion and a second portion distal to the curved portion, wherein the first portion slopes radially inwardly from the curved portion toward the aperture, and wherein the second portion slopes radially outwardly from the aperture and away from the bushing; and a shoulder bolt disposed through the bushing, the spring clip, and the stack of damping washers and engaged to the mounting portion.

12. The fluid conduit of claim 11, wherein the plurality of tubes comprises three tubes; and wherein the three tubes are joined at a T-junction.

13. The fluid conduit of claim 12, wherein the plurality of tubes comprises a first tube in fluid communication through a gas turbine casing with a fuel supply; a second tube in fluid communication with the first tube and coupled to a first axial fuel staging injector mounted to a combustor; and a third tube in fluid communication with the first tube and coupled to a second axial fuel staging injector of the combustor.

14. The fluid conduit of claim 11, wherein the plurality of tubes is disposed within a compressor discharge casing that defines a high-pressure, high-temperature plenum.

15. The fluid conduit of claim 13, wherein the vibration damper is positioned immediately adjacent to the T-junction on the first tube.

16. The fluid conduit of claim 13, wherein the first tube includes a first portion extending from the T-junction, a curved elbow portion extending from the first portion, a third portion extending from the curved portion; and wherein the vibration damper is positioned on the third portion about an inch from the curved elbow portion.

17. A vibration damper for a fluid conduit of a gas turbine combustor, the vibration damper comprising:

a mounting portion secured to the fluid conduit; and a damping portion, the damping portion including: a stack of damping washers, a bushing on top of the stack of damping washers, a spring clip secured around the stack of damping washers and the bushing, and a shoulder bolt disposed through the bushing and the stack of damping washers and engaged to the mounting portion, wherein the bushing includes a cylindrical portion and a locking key projecting therefrom; and wherein the spring clip includes a top surface defining an aperture with a locking recess, the aperture and the locking recess being sized to correspond, respectively, to the cylindrical portion and the locking key and being aligned such that the top surface of the spring clip fits over the cylindrical portion of the bushing, and the locking key of the bushing fits into the locking recess.

* * * * *